(12) United States Patent
Jung

(10) Patent No.: US 7,874,484 B2
(45) Date of Patent: Jan. 25, 2011

(54) SMART KEY HAVING PORTABLE MEMORY CARD

(75) Inventor: Sang Yong Jung, Yongin-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/290,372

(22) Filed: Oct. 30, 2008

(65) Prior Publication Data

US 2009/0152355 A1 Jun. 18, 2009

(30) Foreign Application Priority Data

Dec. 14, 2007 (KR) .................... 10-2007-0131002

(51) Int. Cl.
*G06K 7/06* (2006.01)
(52) U.S. Cl. .................. 235/441; 235/492; 235/487
(58) Field of Classification Search ............... 235/492, 235/441, 487
See application file for complete search history.

(56) References Cited

U.S. PATENT DOCUMENTS

| | | | | |
|---|---|---|---|---|
| 2002/0055287 A1* | 5/2002 | Sato | ...................... | 439/159 |
| 2004/0230348 A1* | 11/2004 | Mann et al. | .................. | 701/1 |
| 2005/0020314 A1* | 1/2005 | Choi | ..................... | 455/564 |

FOREIGN PATENT DOCUMENTS

| KR | 1020050087944 | 9/2005 |
|---|---|---|
| KR | 1020070081528 | 8/2007 |

OTHER PUBLICATIONS

Korean Search Report dated Jul. 1, 2010, corresponding to Korean Patent Application No.: 10-2007-0131002.

* cited by examiner

*Primary Examiner*—Karl D. Frech
(74) *Attorney, Agent, or Firm*—Edwards Angell Palmer & Dodge LLP; Peter F. Corless

(57) ABSTRACT

The present invention provides a smart key in which a portable memory card is detachably mounted. The smart key includes a card mounting portion into which a portable memory card having at least one terminal is inserted, a card reader for the portable memory card, and a connector for connecting the smart key to the key box. The card reader comprises an interface to which the terminal or terminals are connected and a control unit for converting data received from the portable memory card into a format readable by an audio system of the vehicle.

1 Claim, 4 Drawing Sheets

SMART KEY HAVING PORTABLE MEMORY CARD

CROSS-REFERENCE TO RELATED APPLICATIONS

This application claims priority to Korean Application No. 10-2007-0131002 filed on Dec. 14, 2007, the entire disclosure of which is incorporated herein by reference.

BACKGROUND

1. Technical Field

The present invention relates generally to a smart key in which a portable memory card is detachably mounted.

2. Background Art

Recently, the use of smart keys has proliferated in order to prevent vehicles from being stolen and to increase convenience.

Starting or stopping the engine of a vehicle using a smart key is performed in such a way that, when a user inserts the smart key into a key box or turns the smart key after inserting it into the key box, the starting unit of the vehicle compares encrypted data received from the smart key with encrypted data inputted in advance, and the engine is started or stopped if it is determined that the user is an authenticated user.

Meanwhile, because it has recently become popular to store and carry music files, moving image files and the like using portable memory devices, such as USB memory sticks, vehicle makers enable files, which are recorded in portable memory devices, to be freely played in vehicles by providing a Universal Serial Bus (USB) port in an audio system. However, there is a problem in that annoyance and inconvenience are incurred because users must carry separate memory devices in addition to their smart keys.

SUMMARY OF DISCLOSURE

Accordingly, the present invention has been made keeping in mind the above problems occurring in the prior art, and the present invention is directed to provide a smart key that can be used as a portable memory card.

The present invention provides a smart key including: a card mounting portion; a portable memory card having at least one terminal and detachably inserted into the card mounting portion; a card reader comprising an interface to which the terminal or terminals are connected, and a control unit for converting data received from the portable memory card into a format readable by an audio system of the vehicle; and a connector for connecting the smart key to the key box.

The interface may include at least one terminal insertion slot and a contact terminal supported by a first spring in the terminal insertion slot or each of the terminal insertion slots.

Preferably, the interface comprises at least one ejector supported by a second spring for ejecting the portable memory card.

The smart key may further include a manual key mounting portion that is provided in one side portion thereof.

BRIEF DESCRIPTION OF THE DRAWINGS

The above and other objects, features and advantages of the present invention will be more clearly understood from the following detailed description taken in conjunction with the accompanying drawings, in which:

FIG. 2 is a view showing the state before the terminals of a portable memory card are inserted into terminal insertion slot, FIG. 3 is a enlarged view of the portion indicated with the character "A" in FIG. 2, and FIG. 4 is a view showing the state in which the terminals of the portable memory card are inserted into the terminal insertion slot and brought into close contact with contact terminals.

DETAILED DESCRIPTION

A smart key having a portable memory card according to a preferred embodiment of the present invention is described in detail with reference to the accompanying drawings below.

Figure 1:
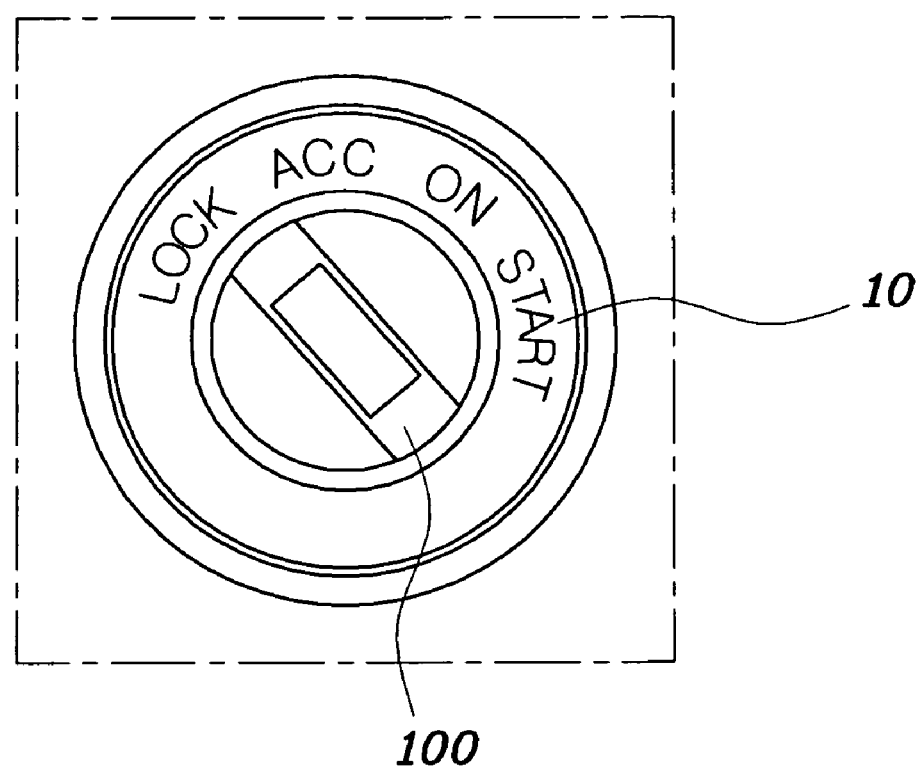
FIG. 1 is a view showing the use of a smart key according to an embodiment of the present invention.

Referring to FIG. 1, the smart key 100 is inserted into a key box 10, which is installed in the front of a user's seat of a vehicle or in a steering column, for use thereof. In this state, encrypted data, which is necessary to start or stop an engine or to use the vehicle, is provided to the starting unit while communication with the starting unit (not shown) of the vehicle is performed.

Figure 2:
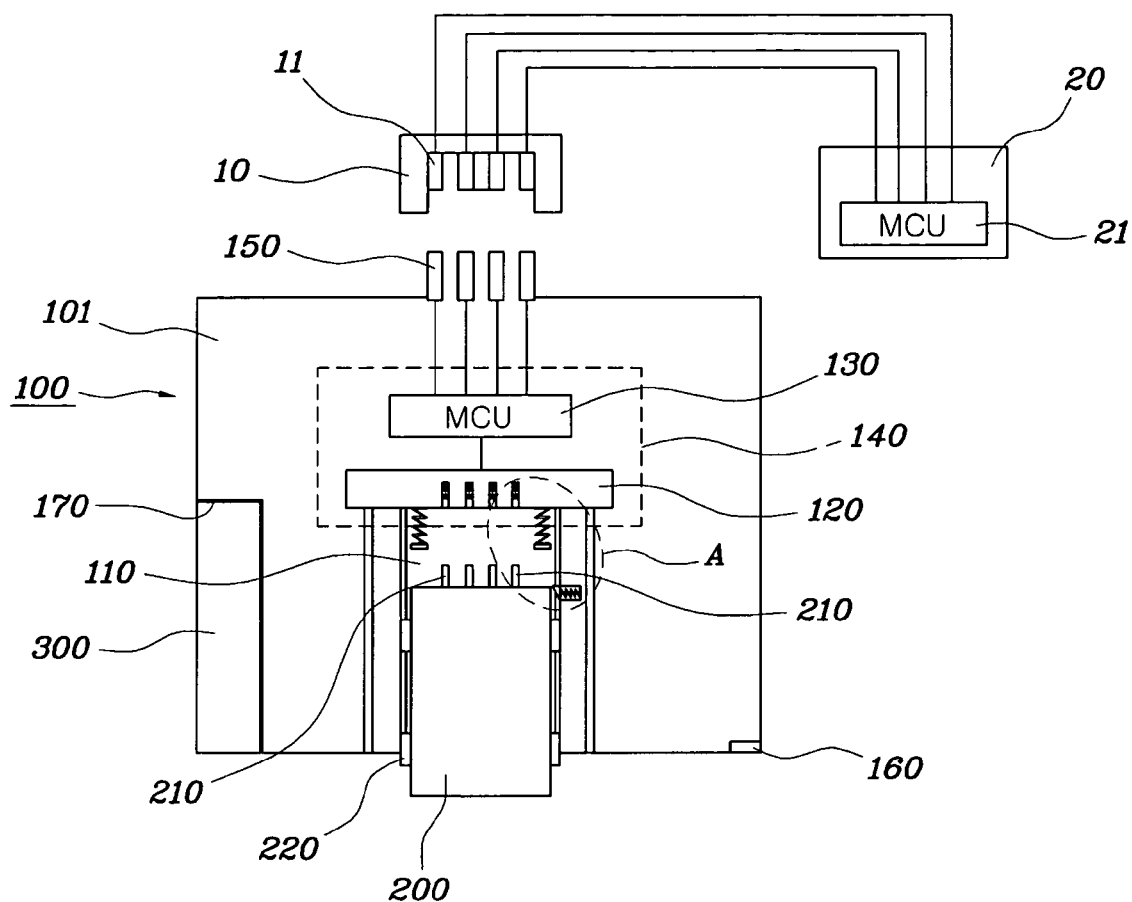
FIGS. 2 to 4 are diagrams showing the structure of the smart key shown in FIG. 1.
Figure 3:
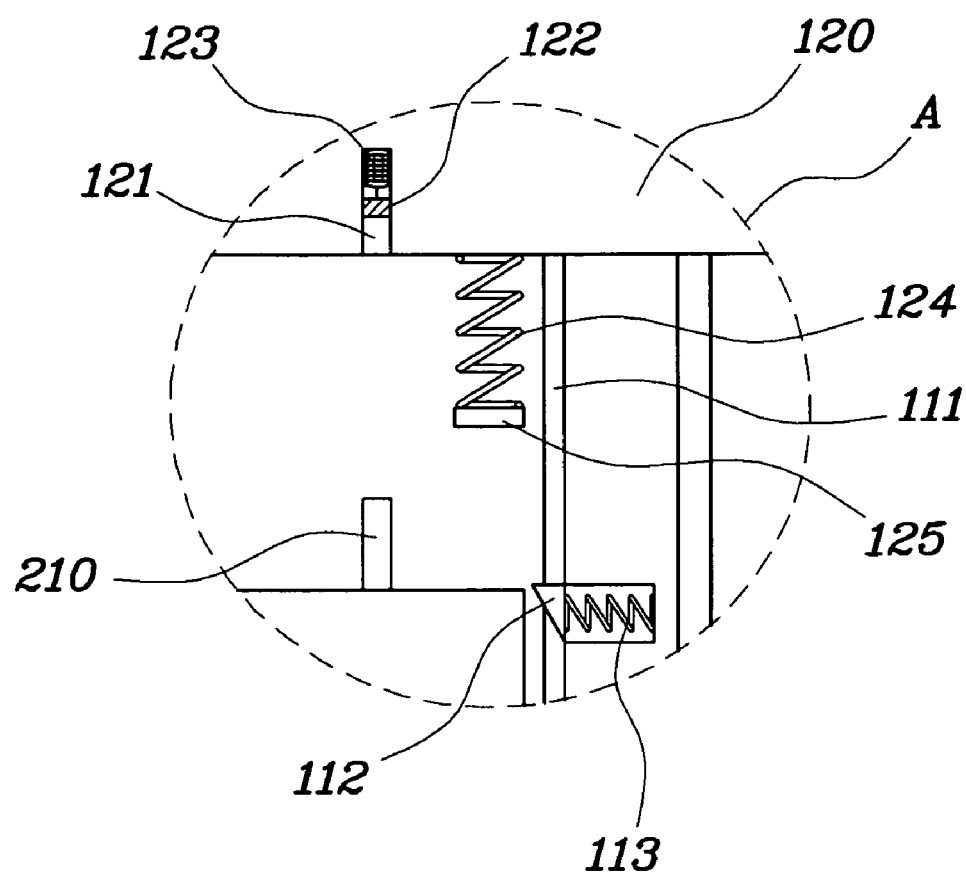
Figure 4:
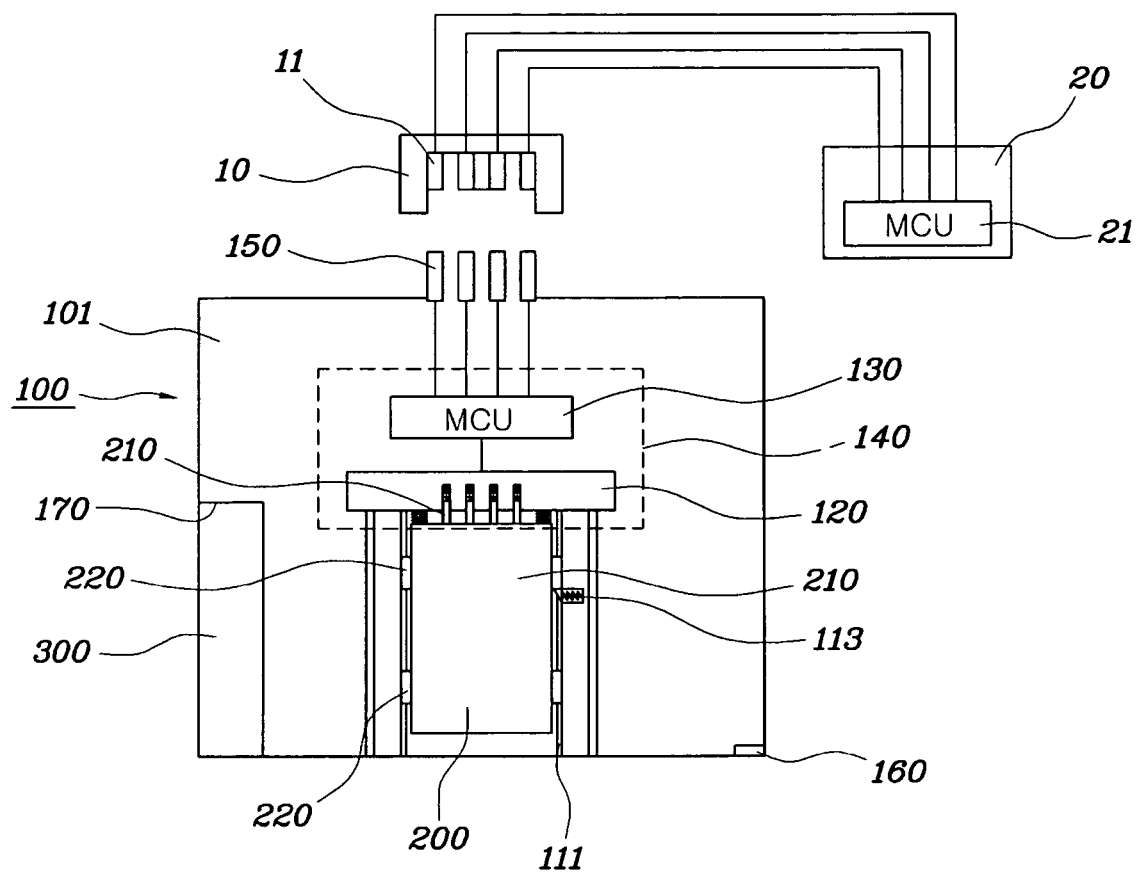

The detailed structure of the smart key 100 is described with reference to FIGS. 2 to 4 below. Here, it should be noted that parts of elements, which are necessary to restore the original performance of the smart key 100, are omitted in the drawings and in the following description.

The smart key 100 includes a card mounting portion 110, a card reader 140 and a connector 150. A portable memory card 200 is detachably mounted in the card mounting portion 110, and is fastened thereto. The card reader 140 reads data stored in the portable memory card 200 and then transmits the read data to the audio system 20 of the vehicle via the connector 150. The connector 150 is inserted into the key box 10, which is provided in the vehicle, and is connected to the connector 11 of the key box 10. The connector 11 of the key box 10 is connected to the audio system 20 of the vehicle.

The card mounting portion 110 is provided in the rear end of a smart key housing 101, and has the shape of a depression, which has a size set such that the portable memory card 200 can be inserted thereinto. Guide grooves 111 are formed in respective side portions of the above-described card mounting portion 110. A retractable stopper 112, which is used to fix the location of the card 100, which is inserted into the mounting unit 110, is provided on a guide groove side.

The card reader 140 includes an interface 120, which is used to read data stored in the portable memory card 200, and a control unit 130.

The interface 120 includes at least one terminal insertion slots 121 and contact terminals 122 supported by first springs 123 in the terminal insertion slots 121. Furthermore, the interface 120 includes ejectors 125 for ejecting the portable memory card 200 received in the card mounting portion 110. The ejectors 125 are supported by respective second springs 124.

The control unit 130 converts data received through the interface 120 into a format suitable for the audio system 20 of the vehicle, and transmits the converted data to the audio system 20 via the connector 150.

The connector 150 of the smart key 100 is inserted into the key box 10 of the vehicle and comes into contact with the connector 11 of the key box 10. The connector 11 of the key box 10 is connected to the audio system 20. When it is determined that data inputted through the key box 10 is suitable for use in the audio system 20, the control unit 21 of the audio system 20 reproduces the data.

The portable memory card 200 is configured such that terminal 210, which are exposed outside the portable memory card 200, are provided in the leading end thereof, and protruding guides 220 are provided on the side surfaces thereof. When the portable memory card 200 is inserted into the card mounting portion 110, the guide 220 moves along the guide grooves 111 of the mounting unit 110. Subsequently, when the portable memory card 200 is pushed to the inner end of the mounting unit 110, the terminal 210 of the card 200 is inserted into the terminal insertion slot 121, and thus the terminal 210 pushes the contact terminal 122 backwards by overcoming the elastic force of the first springs 123. In this case, the first springs 123 provide the elastic force for pushing the contact terminal 122 forward in the state in which the terminal 210 and the contact terminal 122 are in contact with each other, so that the contact between the terminal 210 and the contact terminal 122 can be stably maintained. Furthermore, the contact terminal 122 is elastically supported by the first spring 123, so that damage to the terminal 210 can be prevented in a process of inserting the terminal 210 into the terminal insertion slot 121 to bring the terminal 210 into contact with the contact terminal 122.

Meanwhile, the stoppers 112, which are provided in the card mounting portion 110, are configured to be supported by respective springs 113, and to be pushed backwards when a card eject button 160, which is provided in the rear end of the housing 101, is pressed. The above-described stoppers 112 are parts that are used to fix the location of the portable memory card 200 in the card mounting portion 110, and the eject button 160 is a part that is used to eject the card 200. The above-described parts may be implemented in various ways using known technology. The ejectors 125, which are supported by the second springs 124, provide elastic force for ejecting the memory card 200, the engaging and locking of which is caused by the stoppers 112 and is released by pressing the eject button 160.

A manual key mounting unit 170 is provided in one side portion of the housing 101 of the above-described smart key 100. A manual key 300 is stored in the mounting unit 170, so that the user can start the engine of the vehicle using the manual key 300 when the engine cannot be started using the smart key 100.

As described above, the smart key of the present invention can be used to start and stop the engine of a vehicle, and enables data, which is stored in the portable memory card, to be read and enables the read data to be reproduced in the audio system of the vehicle, so that it can be conveniently used by a user.

Furthermore, the manual key is mounted in the smart key, so that the engine of a vehicle can be started using the manual key in an emergency situation.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A smart key inserted into a key box for communication with a starting unit of a vehicle, the smart key comprising:
    (a) a card mounting portion;
    (b) a portable memory card having at least one terminal and detachably inserted into the card mounting portion;
    (c) a card reader comprising an interface to which the terminal or terminals are connected, and a control unit for converting data received from the portable memory card into a format readable by an audio system of the vehicle,
    wherein the interface comprises:
    (i) at least one terminal insertion slot; and
    (ii) a contact terminal supported by a first spring in the terminal insertion slot or each of the terminal insertion slots,
    (iii) at least one ejector supported by a second spring for ejecting the portable memory card;
    (d) a connector for connecting the smart key to the key box; and
    (e) a manual key mounting portion that is provided in one side portion thereof.

* * * * *